United States Patent
Wakamatsu et al.

[15] 3,683,019
[45] Aug. 8, 1972

[54] 2-AMINOLICOSANEDIOIC ACIDS

[72] Inventors: Hachiro Wakamatsu, Tokyo; Taketoshi Okami; Jiro Sato, both of Kanagawa-ken, all of Japan

[73] Assignee: Ajinomoto Co., Inc., Tokyo, Japan

[22] Filed: March 2, 1970

[21] Appl. No.: 15,873

[30] Foreign Application Priority Data

March 14, 1969 Japan ..................44/19349

[52] U.S. Cl...............260/534 E, 252/110, 252/117, 252/356, 260/309.5, 260/404.5, 260/410.9, 260/482 P, 424/313, 424/319
[51] Int. Cl..............................................C07c 101/20
[58] Field of Search ......................260/534 E, 482 D

[56] References Cited

UNITED STATES PATENTS

| | | | |
|---|---|---|---|
| 2,205,995 | 6/1940 | Ulrich | 260/534 E |
| 2,855,428 | 10/1958 | Singer et al. | 260/534 E |
| 2,407,645 | 9/1946 | Bersworth | 260/534 E |
| 2,744,086 | 5/1956 | Moury et al. | 260/534 E |
| 3,228,904 | 1/1966 | Morris et al. | 260/534 E |

FOREIGN PATENTS OR APPLICATIONS

37/5907 6/1962 Japan...................260/534 G

*Primary Examiner*—Lorraine A. Weinberger
*Assistant Examiner*—John F. Terapane
*Attorney*—Kelman and Berman

[57] ABSTRACT

2-Aminoeicosansdiaic acids of the formula

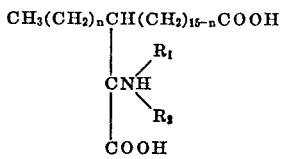

wherein $n$ is 7 or 8, and $R_1$ and $R_2$ are hydrogen or lower alkyl, are readily prepared by Strecker reaction and hydrolysis from the mixture of methyl 9-formylstearate and methyl 10-formylstearate which results from hydroformylation of methyl oleate, and is referred to hereinafter as methyl 9(10)-formylstearate. The aqueous neutral or alkaline solutions of the acids have excellent detergent properties.

2 Claims, No Drawings

2-AMINOLICOSANEDIOIC ACIDS

This invention relates to the novel 2-aminoeicosandioic acids of the formula:

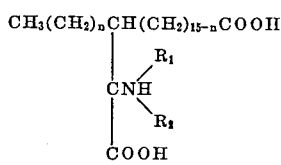

(wherein $n$ is 7 or 8; and $R_1$ and $R_2$ are hydrogen or lower alkyl.), and relates to a method of preparing them, and to their use as detergents.

The compounds consist of a hydrophobic long chain alkyl group and three functional groups, which gives them surface-active and polymerization ability, and they can be modified by converging the functional groups to other suitable ones.

It has been found that 2-aminoeicosanedicarboxylic acids have the following properties:

1. Their surface-activity in a neutral or alkaline solution is high and the foaming tendency is low.
2. They are soluble in a concentrated aqueous solution of inorganic salts, without being salted-out. For instance, they have stable surface-activity even in a 60 wt. percent aqueous solution of inorganic salts. They do not produce a precipitate with proteins, particularly in a neutral or alkaline aqueous solution. The detergency, particularly in hard water is high.
3. They are stable against heat, acid or alkali in solution and in the solid state.
4. The chelating ability is high. For example, they readily form a copper salt.
5. The solubility in water is great under neutral and alkaline conditions and they give an aqueous solution of more than 20 wt.% concentration. The Krafft point is low.
6. The dispersing and emulsifying powers for fine particles, such as carbon-black, clay, dirt, dirty oil and the like are great.
7. They do not irritate the human skin and mucous membranes.
8. They have a strong affinity for the surfaces of metal, protein and the like.
9. Enzymes, such as protease, amylase and lipase, are not significantly hardly inactivated by the compounds. Therefore, enzymatic cleaning materials containing the compounds of this invention as a main component retain their enzyme activity for prolonged periods.

Therefore, the compounds, their ammonium, alkali metal, other metal salts or their mono esters are useful in the textile, dyeing, plastic, tanning, paints, printing, food, cosmetics and metal industries. A compound of the invention may be used as a detergent agent, a rust inhibitor, an antistatic agent, an antifoaming agent, a collector, an emulsifying agent, a fuel additive, a lubricant, an oil additive and an antioxidant, also as a germicide.

According to the present invention, the compounds are produced in a high yield from 9(10)-formylstearic acid or its ester, which may be obtained by the hydroformylation of an ester of oleic acid using rhodium carbonyl or cobalt carbonyl catalyst, by subjecting the 9(10) - formylstearic acid to Strecker reaction or hydantoin formation reaction and hydrolyzing the product in the presence of a strong acid or base.

9(10)-Formylstearic acid or its lower alkyl ester such as the methyl, ethyl and propyl ester, a source of cyanide ions (hydrogen cyanide, an alkali metal cyanide, or ammonium cyanide) and a source of ammonium ions (ammonia, ammonium hydroxide, ammonium chloride or ammonium cyanide) are heated with or without a source of carbonate ions (carbon dioxide gas, ammonium carbonate, an alkali metal carbonate, or an alkali metal bicarbonate) to a temperate of 50-150°C under atmospheric or elevated pressure in a water soluble organic solvent containing water. When a dialkyl amine or monoalkylamine is used instead of ammonia, the N-dialkyl-substituted compound or the N-monoalkyl-substituted compound is obtained.

As the starting compound, the lower alkyl ester such as methyl ester is desirable and it is recommended to mix a solution of the ester in a water soluble solvent such as methanol, ethanol, dioxane, glycerol, ethylene glycol, isopropanol or n-propanol, preferably methanol or ethanol, with an aqueous solution of the salts which are the secondary materials.

A suitable volume ratio of the organic solvent to water is 1:5 to 5:1 and the solvent mixture is used in an amount to make the concentration of the starting compound about 0.1–3 moles/l.

Other known methods for converting an aldehyde to the corresponding α-amino acid or a N-alkyl substituted α-amino acid; can also be employed.

After the Strecker or hydantoin formation reaction, the aminonitrile, N-alkyl substituted aminonitrile or hydantoin derivative in the reaction mixture is hydrolyzed by adding a strong acid such as hydrochloric acid or sulfuric acid, or a strong base such as sodium, potassium, calcium or barium hydroxide to the reaction mixture and heating to, about 100° C. for several hours under atmospheric pressure, or about 150°–250° C. for up to 40 minutes under an elevated pressure. When an ester of 9(10)-formylstearic acid is used as a starting compound, the ester moiety of the compound is hydrolyzed simultaneously to give the same compound as obtained from the free acid as a starting compound. Although the hydrolysis can be carried out after separating the intermediate aminonitrile, N-alkyl-substituted aminonitrile or hydantoin derivative from the reaction mixture, it is advantageous to perform the hydrolysis in reaction mixture without the separation of the intermediate.

When the product is a free amino acid, the product can be easily isolated from the hydrolysis mixture by removing the organic solvent, adding water to the residual mixture, adjusting the pH of the solution to 3-4, whereby the product is precipitated as white flakes, and filtering the. When the product an N-alkyl-substituted amino acid, the product can be separated from other substances on the basis of the solubility difference in organic solvents.

The isolation of the product is sometimes difficult and the product is obtained as a viscous coagulum when the purity of the starting compound is low. In such a case, the product can be purified by dissolving the coagulum in one normal aqueous sodium hydroxide, and making the solution weakly acidic with hydrochloric acid to precipitate the product, and repeating this procedure several times. The purification can also be achieved by dissolving the coagulum in an organic solvent such as ethanol, and adding a non-solvent such as benzene to precipitate the product.

According to the method of this invention, the desired product is obtained in a high yield from an inexpensive material, which is derived from soybean oil by an easy operation.

EXAMPLE 1

A mixture of 65.2 g of methyl 9(10)-formylstearate (Purity 94.8 percent; see Example 7), 19.6 g of sodium cyanide, 76.8 g of ammonium carbonate, 250 ml of water and 1 liter of ethanol was heated to 100° C. for 7 hours in a 2 liter autoclave. After cooling the, a solution of 100 g of sodium hydroxide in 250 ml of water was added and the mixture was heated to 200° C. for 30 minutes, cooled, and concentrated to a semisolid material which was then dissolved in water. To the solution, hydrochloric acid was gradually added. When the pH became 7, the whole solution became a translucent gel which was further converted to a mixture of white flakes and transparent liquid at pH 3–4. The flakes were separated by filtration and washed repeatedly with water to remove sodium chloride. The flakes were air-dried, then dried in a vacuum, and consisted of 61.3 g of 2-aminoeicosanedioic acid. (Yield 90.5 percent)

Melting point: 148°–150° C.

Solubility: Soluble in aqueous inorganic acids and alkali, in methanol, ethanol and acetic acid. Hardly soluble in chloroform. Insoluble in acetone, ether, benzene and cyclohexane. When the concentrated solution prepared by dissolving the compound in hot methanol or ethanol is cooled, it gels.

In methyl oleate or methyl linoleate, the compound is insoluble at 120° C, but dissolves above 160° C. and does not crystallize upon cooling to room temperature In soybean oil, the compound is hardly soluble at 150° C., but soluble at 200° C.

Paper chromatography:

Rf value;  1.0 (Solvent A or B)
           0.6 (Solvent C)

Solvent A: Butanol·Acetic acid·Water (4:1:1 by vol.)
Solvent B: Phenol·Water (3:1 by vol.)
Solvent C: Butanol·Methylethyl ketone·Ammonia·Water (5:3:1:1 by vol.)

A blue-violet spot similar to that of alanine is developed by treatment with ninhydrin.

Thin layer chromatography:

Rf value;  0.01 (Solvent D)
           0.06 (Solvent E)
           0.02 (Solvent F)

Solvent D: Hexane·Butanol (4:1 by vol.)
Solvent E: Hexane·Ethanol (4:1 by vol.)
Solvent F: Hexane·Ethanol (9:1 by vol.)

(Bromocresol Green was used as the color-producing reagent.)

PH value of 0.25% aqueous solution of monosodium 2-aminoeicosanedioate:

| Temp. | pH |
|---|---|
| 22°C | 7.8 |
| 35°C | 7.6 |

Elementary analysis:

| | C | H | N% |
|---|---|---|---|
| Calculated for $C_{20}H_{39}NO_4$ | 67.19 | 11.00 | 3.92 |
| Found | 67.13 | 11.17 | 3.92 |

EXAMPLE 2

20 Ml of water, 12.5 g of sodium bisulfite and 32.6 g of methyl 9(10)-formylstearate were stirred for 30 minutes. Then, 6.45 g of 70 percent aqueous solution of ethylamine was added dropwise. After stirring for further 30 minutes, 5 g of sodium cyanide was added all at once and the mixture was stirred for further 30 minutes.

To the reaction mixture, 100 ml of water was added to dissolve inorganic precipitates, and the solution was extracted with ether. The extract was evaporated in a vacuum to 19 g. A mixture of the concentrate, 20 g of sodium hydroxide, 15 ml of water and 15 ml of methanol was heated to 200° C. for 10 minutes in a 100 ml autoclave. The reaction mixture was dissolved in water. The pH of the aqueous solution was adjusted to 3–4 with hydrochloric acid and the solution was extracted with ether. The extract was dried with anhydrous magnesium sulfate and filtered. The filtrate when evaporated in a vacuum at room temperature, yielded 16 g of N-ethyl-2-aminoeicosanedioic acid as an oily substance.

Solidifying temperature: −35 − −40°C
Color development by ninhydrin: None
Thin-layer chromatography:

Rf value;  0.88 (Solvent D)
           0.81 (Solvent E)
           0.37 (Solvent F)

(The color producing agent and the solvent systems used were the same as in Example 1;)

Solubility: Easily soluble in ether, methanol, ethanol, acetic acid. Soluble in benzene and chloroform but gives a slightly turbid solution which becomes transparent at about 30°C. Insoluble in cold n-hexane but soluble at about 40°C.

PH value of 0.25% aqueous solution of monosodium N-ethyl-2-aminoeicosanedioate:

| Temp. | pH |
|---|---|
| 22°C | 8.1 |
| 35°C | 8.0 |

EXAMPLE 3

A mixture of 6.52 g of methyl 9(10)-formylstearate, 1.96 g of sodium cyanide, 12.8 ml of 70 percent aqueous solution of ethylamine, 15 ml of methanol, 10 ml of water and 2.4 g of dry ice was heated to 120° C. for 1 hour with stirring in a 100 ml autoclave. After cooling a solution of 10 g of sodium hydroxide in 25 ml water was added and the mixture was further heated to 200° C. for 15 minutes. Then, the reaction mixture was worked up as described in Example 2 to obtain 5 g of N-ethyl-2-aminoeicosanedioic acid.

EXAMPLE 4

A mixture of 13.04 g of 9(10)-formylstearate, 3.92 g of sodium cyanide, 31 ml of 40 wt. percent aqueous methylamine, 5 g of dry ice, 20 ml of methanol and 30 ml of water was heated to 120° C. for one hour in a 300 ml autoclave. After cooling, 10 g of sodium hydroxide was added, and the mixture was heated to 200° C. for 15 minutes and further treated as in Example 2 to yield 12.0 g of faint yellow oily N-methyl-2-aminoeicosanedioic acid.

Thin-layer chromatography: Rf value; 0.42 (Solvent F)

Solubility: Similar to N-ethyl-2-aminoeicosanedioic acid.

EXAMPLE 5

In a 2-liter autoclave, 600 ml of an ethanol solution containing 163 g of methyl 9(10)-formylstearate (Purity 99.5 percent) and 400 ml of an aqueous solution of 1.5 moles/l hydrogen cyanide, and, 12 moles/l ammonia were heated to 120° C. for 5 minutes. After cooling, 100 g of sodium hydroxide was added and the mixture was heated to 200° C. for 30 minutes to hydrolyze the intermediate formed. The hydrolyzate was worked up as in Example 1 to 152 g of 2-aminoeicasanedioic acid. (Yield 85 percent)

EXAMPLE 6

The procedure of Example 3 was repeated, but 600 ml of an aqueous solution containing 1.0 mole/l hydrogen cyanide and 6.7 moles/l dimethylamine was used instead of the ammoniacal solution and N.N-dimethyl-2-aminoeicosanedioic acid was obtained.

Thin-layer chromatography:
Rf; 0.52 (Ethanol:Acetic Acid 95:5 by volume)
0.57 (Methanol:Chloroform 1:1 by volume)
Solubility: Soluble in methanol, ethanol, tetrahydrofuran and aqueous alkaline solutions. Hardly soluble in hexane, benzene, ethyl ether and water.

EXAMPLE 7

Benzene was added to 297.3 g of methyl oleate containing, as impurities, 5% linoleic acid and traces of methyl stearate and methyl linoleate and 150 mg of rhodium oxide to make the volume of the mixture 1 liter. The mixture was placed in a 1.6-liter auto-clave and equal volumes of carbon monoxide and hydrogen gas were admitted to the autoclave until the pressure reached 200 kg/cm$^2$, whereupon the contents of the autoclave were heated to 110°–130° C. for 30 minutes with stirring. After cooling, the mixture was partly evaporated to recover the solvent. The concentrate was fractionated in a vacuum to obtain 301.4 g of a distillate of boiling point of 204°–221° C. (3–4 mmHg), which was further fractionally distilled with a 30 cm distillation column to obtain the following fractions:

| | |
|---|---|
| 1st fraction (164–190°1.0–1.2 mmHg) | 10 g |
| 2nd fraction (192–182°1.2–0.5 mmHg) | 171.4 g |
| (Purity measured by gas chromatography. | 94.8%) |
| 3rd fraction (182–176°0.5–0.25 mmHg) | 108.1 g |
| (Purity measured by gas chromatography. | 99.5%) |

The 2.4-dinitrophenylhydrazone of the methyl-9(10) formylstearate so obtained melted at 73°–76° C.

Elementary analysis:

| | C | H | N% |
|---|---|---|---|
| Calculated for $C_{26}H_{42}N_4O_6$ | 61.63 | 8.36 | 11.06 |
| Found | 61.84 | 8.32 | 10.75 |

EXAMPLE 8

To 5.1 g of 2-aminoeicosanedioic acid in 80 ml of methanol, 100 ml of methanol saturated with hydrogen chloride were added and the mixture was refluxed for 45 minutes. After the reaction, excess hydrogen chloride and methanol were removed by vacuum distillation. The oily residue was neutralized with 10 percent methanollic sodium hydroxide. The sodium chloride precipitated was removed by filtration and ethyl ether was added to the filtrate to precipitate a white translucent substance which was reprecipitated from methanol-ether, and washed with petroleum ether to remove the diester formed by a side reaction. 3.0 G of the desired monomethyl 2-aminoeicosanedicarboxylate were obtained as a translucent amorphous material.

Melting point: 179°–180° C. (decomp.)
Solubility: Soluble in aqueous, methanolic and ethanolic solutions of inorganic acids or bases, and in acetic acid. Soluble in hot methanol or ethanol, but a concentrated hot solution gels upon cooling. Hardly soluble in acetone, ether and chloroform. Insoluble in water, benzene and hexane.
The solubilities in methyl oleate, methyl lino-leate and soybean oil are similar to those of 2-aminoeicosanedioic acid.

Paper chromatography: Rf value; 1.0 (Solvent A, B or C)

Elementary analysis:

| | C | H | N% |
|---|---|---|---|
| Calculated for $C_{21}H_{41}O_4N$ | 67.88 | 11.12 | 3.77 |
| Found | 67.65 | 11.13 | 3.91 |

EXAMPLE 9

20 Parts of monosodium 2-aminoeicosanedioate and monosodium N-ethyl-2-aminoeicosanedioate were each dissolved in 80 parts of water to obtain transparent liquid detergents. The detergents were subjected to comparison tests as described below in which the compared materials are identified as follows:

Sample A: Monosodium-2-aminoeicosanedioate
B: Monosodium N-ethyl-2-aminoeicosanedioate
C: Neat soap
D: N-lauroyl sarcosinate
E: Sodium laurylsulfate
Concentration of the sample; 0.25 wt.%
Temperature; 40°C i. Foaming Ability:
According to the method of JIS (Japanese Industrial Standard) K–3362–1955, foaming ability (height of foam) was measured.

| Sample after | Height of Foam (mm) | | | | |
|---|---|---|---|---|---|
| | 0 min. | 5 min. | 10 min. | 20 min. | 30 min. |
| A | 150 | 114 | 37 | 3 | — |
| B | 69 | 19 | 11 | 6 | — |
| C | 175 | 158 | 158 | 154 | 154 |
| D | 130 | 115 | 110 | 100 | 98 |
| E | 205 | 180 | 179 | 177 | 177 | ii. Lime Soap Dispersing Power:

The minimum amount of the sample detergent necessary for completely dispersing calcium oleate was measured by the method described in the Journal of the American Oil Chemists' Society, 27, 90 (1950).

$$\text{Lime soap dispersing power percent} = \frac{\text{Weight of the detergent to disperse lime soap (g.)}}{\text{Weight of sodium oleate (g.)}} \times 100$$

| Sample (concentration) | Lime soap dispersing power, percent |
|---|---|
| A (0.74%) | 148. |
| C (0.25%) | Above 370. |
| E (0.25%) | 150. | iii. Penetration Power

According to the method of JIS K–3362, a test cloth was floated on the surface of 500 ml of an aqueous sample solution in a measuring cylinder of 500 ml capacity by means of a wire ring, and the time till the test cloth began to sink was measured. The temperature of the sample solution was 40° C.

The test cloth: Felt (JIS 20 ounce) 3 × 18 cm, whose moisture was controlled by storage in a desiccator containing ammonium nitrate for 12 hours, prior to use.

The following penetration power values are averages of ten tests.

| Sample | Penetration power |
|---|---|
| A | 8.1 second s (6.7 second at pH 7) |
| B | 4.5 seconds |
| C | above 6 minutes |
| D | 9.4 seconds |
| E | 8.3 seconds |
| water | above 30 minutes | iv. Emulsifying Power:

In a stoppered test tube (10 mm diameter, 390 mm height), 10 ml of an aqueous sample solution and 10 ml of toluene were allowed to stand for 20 minutes in a thermostat of 40° C. Then the test tube was inverted 30 times, being returned to the starting position each time. The test tube was put again in the thermostat and the condition of the mixture (separation of the two layers and height of water layer) was observed. The percentage of toluene emulsified by the sample detergent at various times after the last inversion was as follows.

Emulsified amount of toluene (%)

| Sample | 1 min. | 3 min. | 5 min. | 10 min. | 15 min. | 20 min. | 30 min. |
|---|---|---|---|---|---|---|---|
| A | 82 | 66 | 44 | 33 | 27 | 23 | 18 |
| D | 55 | 30 | 21 | 22 | 10 | 7 | 6 |
| C | 80 | 51 | 37 | 26 | 20 | 17 | 12 | v. Relative Interfacial Tension

According to the method of JIS K–3304 and K–3362, the number of drops (N) of kerosene (3 ml) discharged from a stalagmometer (120 mm height, 0.5 mm diameter) into 150 ml of 0.25 wt. percent or 0.05 wt. percent aqueous sample solution in a vessel (61 mm diameter, 122 mm height) was determined. The discharge rate of the kerosene was 16 ± 2 drops per minute and the temperature was 40° C.

Similarly, the number of drops ($N_0$) of kerosene (3 ml) into 150 ml water was determined.

Relative Interfacial Tension = ($N_0/N$)

| Sample | Relative Interfacial Tension |
|---|---|
| A | 0.198(0.25 wt.%), 0.09(pH 7.0, 0.25 wt.%) |
| B | 0.159(0.25 wt.%) |
| C | below 0.1(0.25 wt.%), 0.45(0.05 wt.%) |
| D | below 0.1(0.25 wt.%), 0.63(0.05 wt.%) |
| E | below 0.1(0.25 wt.%), 0.28(0.05 wt.%) | vi. Relative Surface Tension:

According to the method of JIS K–3304, the number of drops (N) of 0.25 wt. percent aqueous sample solution (5 ml) discharged from a stalagmometer at the rate of 12 ± 2 drops per minute at 40° C. was determined. Similarly, the number of drops ($N_0$) of water (5 ml) was determined under the same condition and the relative surface tension was determined by the following equation.

Relative surface tension = ($N_0/N$)

| Sample | Relative surface tension |
|---|---|
| A | 0.581 |
| C | 0.344 |
| D | 0.629 |
| E | 0.436 | vii. Detergency:

Soiled fabric; Cotton fabric, 5 × 5 cm

| Soil composition; | |
|---|---|
| Substance | Wt.% |
| Myristic acid | 8.4 |
| Oleic acid | 8.4 |
| Tristearin | 8.4 |
| Triolein | 8.4 |
| Cholesterol | 4.4 |
| Cholesterol stearate | 1.0 |
| Paraffin | 5.5 |
| Squalene | 5.5 |
| burned clay | 49.5 |
| Carbon black | 0.5 |

The soil mixture was rubbed on the fabric by hand more than 50 times to reduce the light reflectance to 40–44 percent.

Washing device: Abstergent tester made by Kamishima Seisakusho Ltd. Japan.

Washing method: Six sheets of the soiled fabric were put into a cleaning bath consisting of 900 ml of 0.04 wt. percent aqueous solution (pH 10) of a detergent with or without calcium carbonate, together with unsoiled fabric (5 × 10 cm) to adjust the bath ratio to 50 and washed for 12 minutes at 100 r.p.m. at 25° C. After washing, the fabrics were rinsed with water twice for one minute.

Calculation of detersive efficiency;

$$\text{Detersive efficiency (\%)} = \frac{R - R_1}{R_0 - R_1} \times 100$$

$R_0$: Reflectance of original fabric prior to soiling
$R_1$: Reflectance of soiled fabric prior to washing
R: Reflectance of tested fabric after washing

| Hardness* | Detergent | Detersive efficiency % |
|---|---|---|
| 0 | A | 51.5 |
|   | F | 68 |
| 100 | A | 52 |
|   | F | 42.5 |
| 200 | A | 61 |
|   | F | 43 |
| 300 | A | 58 |
|   | F | 49 |
| 400 | A | 57 |
|   | F | 40 |

Hardness: $CaCO_3$ 1 ppm = hardness 1
Detergent F: sodium n-dodecylbenzenesulfonate viii. Stabilization ability for protease:

Concentration of sample; 0.2 wt.% aqueous solution
Protease: alkaline protease, "Asterase" (Trade Mark), Activity 49.00 $\mu$/g; Concentration in sample solution, 0.06 wt.%
Time: 30 minutes
Temperature: 50°C
Measurement method; Anson's method
pH of sample solution; 9.5

| Sample | Remaining activity of enzyme % | |
|---|---|---|
|  | in water | in buffer |
| A | 82 | 79 |
| E | 1 | 40 |
| F | 2 | 23 |
| ABS | 1 | 34 |

ABS: Sodium alkybenzene sulfonate ix. Stabilization ability for amylase:
Concentration of sample; 0.2 wt. percent aqueous solution
Amylase; CP-1 Spitase (Trade Mark), Activity; 7,000 u/g. Concentration in sample solution, 0.18 wt. percent
Temperature; 50° C.
Time; 30 minutes
pH of sample solution; 7.0
Measurement method; Modification of Wohlgemuth's method: One unit was defined as the amylase activity which decomposes completely 1 ml of 0.65 wt. percent aqueous water-soluble starch solution at 40° C. for 10 minutes. The complete decomposition was determined by measuring the absorbancy at 660 m$\mu$ of a solution colored by starch-iodine reaction and it was deemed that the decomposition was complete when the absorbancy became 0.300.

| Sample | Remaining activity of amylase |
|---|---|
| A | 100 |
| F | 35 |
| water only | 100 | x. Stabilization activity for lipase:
Concentration of sample; 0.2 wt. percent
Lipase; Lipase MY (Trade Mark), Activity 20,000 u/g, Concentration in sample solution 0.12 wt. percent
Temperature; 50° C.
Time; 30 minutes
pH; 7.0
Measurement method; Nord et al.'s method (Journal of the Agricultural and Chemical Society of Japan, 36, 860 (1962))

| Sample | Remaining activity of lipase |
|---|---|
| A | 100 |
| F | 60 |
| water only | 100 | xi. Krafft point:
An aqueous solution of each sample (concentration; 50 millimoles/liter) was cooled and the temperature at which the solution became solid was measured.

| Sample | Krafft point °C |
|---|---|
| A | below 0 |
| ABS | 55 |
| L-LGS | 38 |

L-LGS Sodium N-lauroyl-L-glutamate xii. Irritation of Skin:
Patch tests were carried out on the inner arm surface of 20 women and 20 men
Patch time: 24 hours
Patch: 30 mm × 30 mm four fold gauze wetted with the following sample solutions:
$A_1$; 20 wt. percent aqueous solution of A
$A_2$; 10 wt. percent aqueous solution of A
$B_2$; 10 wt. percent aqueous solution of B
$D_1$; Aqueous solution of sodium dodecylbenzenesulfonate (15 wt. percent) and sodium salt of coconut alcohol sulfate (5 wt. percent).
$D_2$; $D_1$ diluted with water to one-half concentration.

| Sample | Tested persons suffering | | |
|---|---|---|---|
|  | strong irritation | weak irritation | no irritation |
| $A_1$ | 0 | 22 | 18 |
| $A_2$ | 0 | 7 | 33 |
| $B_2$ | 0 | 4 | 36 |
| $D_1$ | 26 | 14 | 0 |
| $D_2$ | 21 | 19 | 0 |

EXAMPLE 10

Sodium dodecylbenzenesulfonate          10 parts
Monopotassium 2-aminoeicosanedicarboxylate 5 parts
Diethanolamide of coconut fatty acid    5 parts
Perfumes a small amount were dissolved in 80 parts of water with stirring to obtain a liquid detergent. The detergent showed good foaming ability and detergency. In patch tests similar to Example 9 (x), 31 of 40 persons tested did not suffer irritation.

EXAMPLE 11

A mixture of 70 parts of neat soap chips and 15 parts of monosodium 2-aminoeicosanedioate was kneaded with water and the mixture was made into bar soap on conventional equipment for preparing milled soap. The bar soap obtained showed proper foaming ability and solubility by rubbing. The lime soap dispersing power of the soap was 200%. It was also found that the stability in hard water was improved by the addition of monosodium 2aminoeicosanedioate.

EXAMPLE 11

| | |
|---|---|
| Monopotassium 2-aminoeicosanedioate | 15 parts |
| Triethanolamine salt of 2-aminoeicosanedioate acid | 5 parts |
| Lauric acid diethanolamide | 5 parts |
| Glycerol | 3 parts | were added to 72 parts of water and dissolved with stirring to obtain a transparent liquid shampoo.

EXAMPLE 11

| | |
|---|---|
| Monosodium N-methyl-2-aminoeicosanedioate | 15 parts |
| Monosodium N,N-dimethyl-2-aminoeicosanedioate | 5 parts |
| Coconut fatty acid diethanolamide | 10 parts |
| Glycerol | 3 parts | were added to 67 parts of water and dissolved with stirring to obtain a transparent shampoo.

EXAMPLE 12

| | |
|---|---|
| Sodium dodecylbenzenesulfonate | 100 parts |
| Monosodium 2-aminoeicosanedioate | 10 parts |
| Sodium polyphosphate | 100 parts |
| Carboxymethyl cellulose | 3 parts |
| Glauber's salt | 450 parts | were made into a slurry with water and the slurry was dried with a spray dryer to obtain 700 parts of white powdered detergent.

What we claim is:

1. A compound which is a dicarboxylic acid of the formula

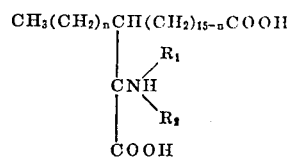

or a mono-lower-alkyl ester or a water soluble salt of said dicarboxylic acid, in said formula, $n$ being 7 or 8, and $R_1$ and $R_2$ being hydrogen or lower alkyl.

2. A compound as set forth in claim 1, which is an alkali metal or ammonium salt of said acid.

* * * * *